(12) United States Patent
Heverly, II et al.

(10) Patent No.: US 10,112,709 B2
(45) Date of Patent: Oct. 30, 2018

(54) VIBRATION CONTROL WITH ACTIVE LAG DAMPER

(71) Applicant: BELL HELICOPTER TEXTRON INC., Fort Worth, TX (US)

(72) Inventors: David E. Heverly, II, Arlington, TX (US); Frank B. Stamps, Colleyville, TX (US); Michael Smith, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 528 days.

(21) Appl. No.: 14/494,036

(22) Filed: Sep. 23, 2014

(65) Prior Publication Data

US 2016/0083088 A1    Mar. 24, 2016

(51) Int. Cl.
*B64C 27/635* (2006.01)
*B64C 27/51* (2006.01)

(52) U.S. Cl.
CPC ............ *B64C 27/635* (2013.01); *B64C 27/51* (2013.01)

(58) Field of Classification Search
CPC .............................. B64C 27/51; B64C 27/635
See application file for complete search history.

(56) References Cited

U.S. PATENT DOCUMENTS

| 5,732,905 A * | 3/1998 | Krysinski | B64C 27/001 |
| | | | 244/17.13 |
| 2003/0012650 A1* | 1/2003 | Ferullo | B64C 27/51 |
| | | | 416/106 |
| 2012/0051909 A1* | 3/2012 | McGuire | F16F 13/08 |
| | | | 416/1 |
| 2013/0164131 A1* | 6/2013 | Russell | B64C 27/51 |
| | | | 416/1 |

* cited by examiner

*Primary Examiner* — Richard Edgar
*Assistant Examiner* — Danielle M Christensen
(74) *Attorney, Agent, or Firm* — James E. Walton

(57) ABSTRACT

A rotor system includes a hub assembly, a first, second, and third rotor blade rotatably attached to the hub assembly, a first, second, and third damper pivotally attached to the hub assembly and pivotally attached to the first, second, and third rotor blade, respectively, and a control system operably associated with the first, second, and third damper. A method to control vibratory forces exerted on the hub assembly via the first and second rotor blade includes separately controlling a dynamic spring rate of each of the first and second dampers with the control system.

18 Claims, 5 Drawing Sheets

VIBRATION CONTROL WITH ACTIVE LAG DAMPER

BACKGROUND

1. Field of the Invention

The present application relates generally to damper systems, and more specifically, to an active lag-damper system for aircraft.

2. Description of Related Art

Dampers are well known in the art for effectively dampening adverse forces exerted on a structure. Rotary aircraft utilize dampers associated with the rotor assembly to dampen forces, e.g., lead/lag forces, exerted on the components of the rotor assembly via the rotor blades during flight. The dampers are typically passive dampers and are manufactured with one or more of elastomeric materials, fluid chambers, or the combination of both to dampen the forces. In some embodiments, the dampers could utilizes a plurality of fluid chamber in communication with each other, wherein movement of the damper means disposed within the damper causes the fluid carried within the chambers to pass through a common passage, which in turn dampens the adverse forces.

A common problem associated with conventional dampers is the limited use, in particular, the inability to controllably manipulate the dynamic spring rate of the damper during flight. For example, the aircraft operates at various flight conditions, which in turn affects the damper's performance. In some scenarios, it is possible to fly outside the designed dynamic spring rate of the damper, thus greatly reducing the efficiency of the damper.

Although the foregoing developments in dampers represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
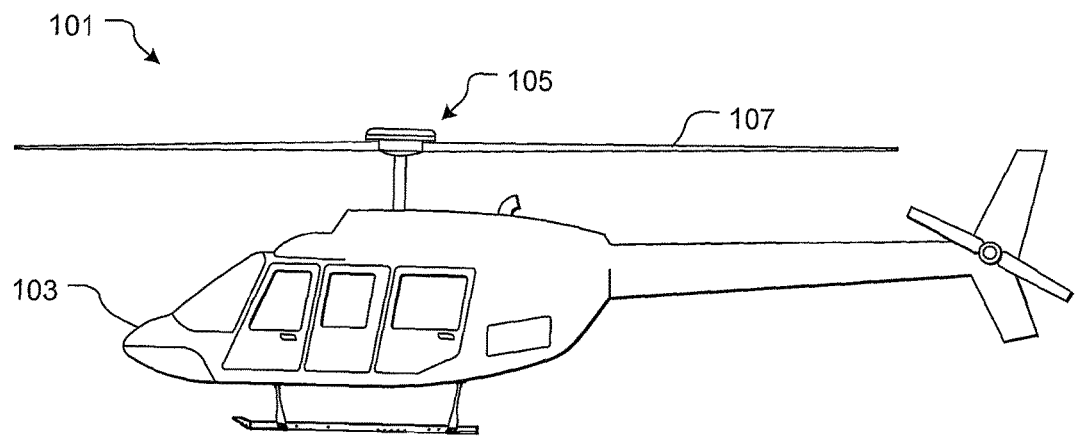
FIG. 1 is a side view of a helicopter according to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcome the above-listed problems commonly associated with conventional dampers. Specifically, the system includes a plurality of rotor dampers configured to reduce, if not eliminate, the vibratory forces exerted on the rotor system, in particular, the rotor hub, during flight. The system is further provided with a computer system configured to actively monitor and adjust the dynamic response characteristics of the damper via a pump system. These features provide real-time adjustment control of the dynamic spring rate for optimal performance during flight. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 2:
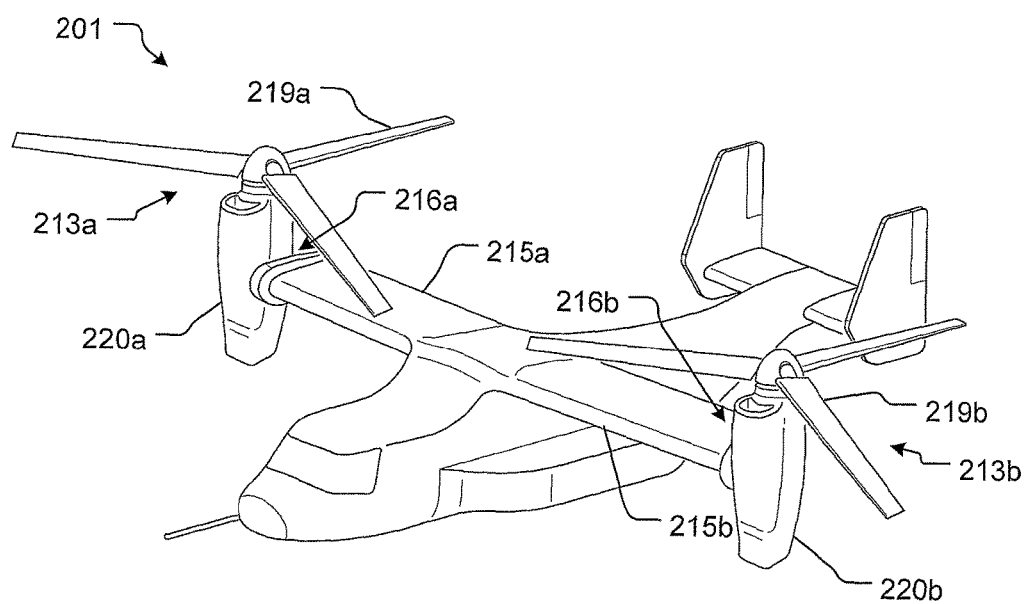
FIG. 2 is a perspective view of a tiltrotor aircraft according to another preferred embodiment of the present application.

Although shown associated with a helicopter, it will be appreciated that the damper system of the present application could also be utilized with different types of rotary aircraft and vehicles. For example, FIG. 2 illustrates a tiltrotor aircraft 201 that utilizes the damper system in accordance with the present application.

Tiltrotor aircraft 201 includes rotor assemblies 213*a* and 213*b* that are carried by wings 215*a* and 215*b*, and are disposed at end portions 216*a* and 216*b* of wings 215*a* and 215*b*, respectively. Tilt rotor assemblies 213*a* and 213*b* include nacelles 220*a* and 220*b*, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

It should be understood that the features discussed herein are preferably utilized with rotor systems having three or more rotor blades. A top view of rotor system 105, as depicted in FIG. 3, illustrates the system with four blades, while FIG. 2 depicts a similar system with three blades.

Figure 3:
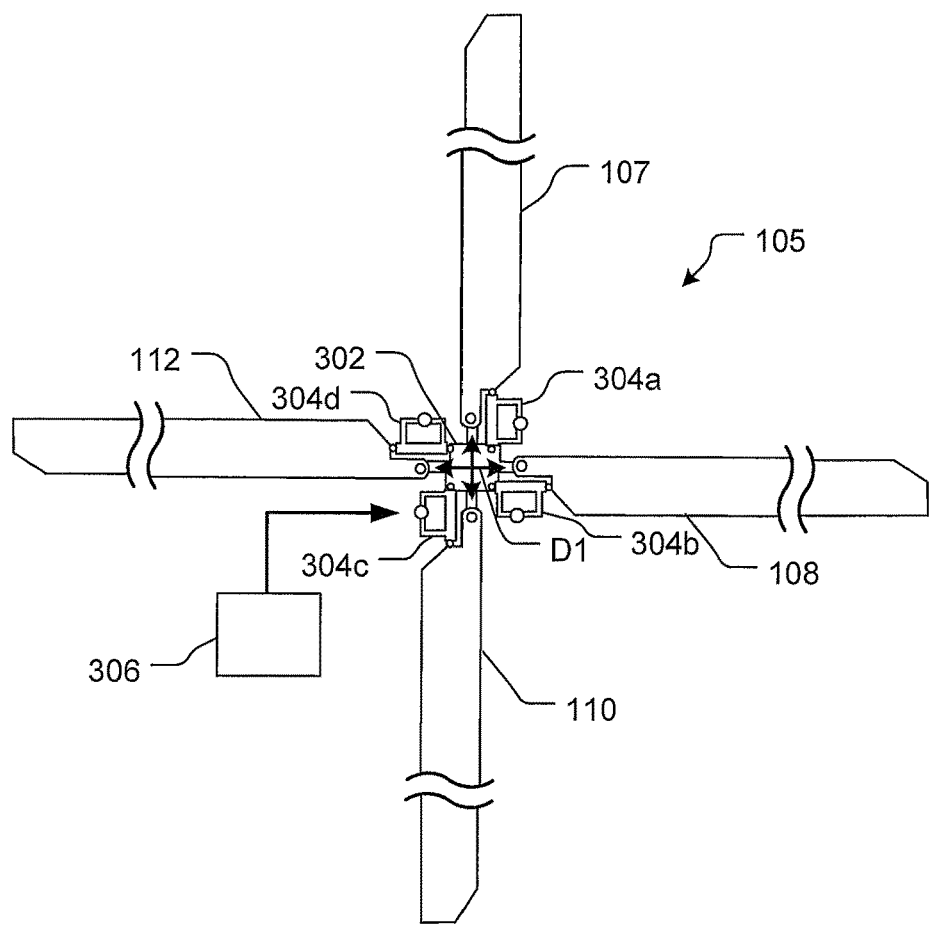
FIG. 3 is a simplified top view of the rotary system of FIG. 1.

Referring now to FIG. 3, rotor system 105 is shown having a four rotor blades 107, 108, 110, and 112 attached to a hub assembly 302. Each blade 107, 108, 110, and 112 is also pivotally attached to a lead-lag damper, specifically, respective dampers 304a, 304b, 304c, and 304d configured to reduce the vibratory forces, as depicted with arrow D1, exerted on the hub assembly 302. A control system 306 is shown operably associated with the dampers and is configured to control each damper independently of each other to reduce the vibrations exerted on the hub assembly. To achieve this feature, it is contemplated incorporating a pump system 412 operably associated with the damper.

Figure 4:
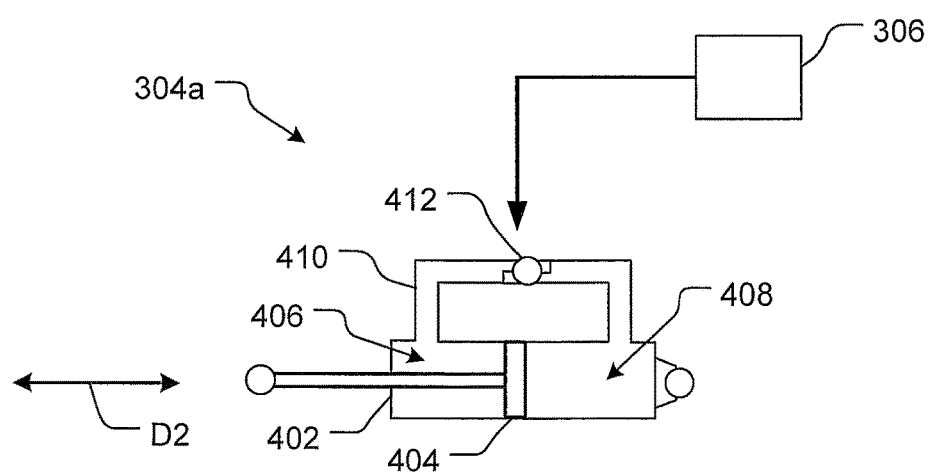
FIG. 4 is a simplified top view of a damper of the rotary system of FIG. 3.

In FIG. 4, a simplified top cross-sectional view of a damper 304a is shown operably associated with control system 306. The features of damper 304a are identical to the features of dampers 304b, 304c, and 304d. As depicted, damper 304a includes a housing 402 with a piston 404 disposed therein. During operation, the piston 404 slidingly engages within housing 402, which in turn dampens the forces exerted thereagainst during flight. Piston 404 creates two chambers 406, 408 on opposing ends and in communication with each other via a conduit 410 positioned outside the housing 402. A pump system 412 is in communication with conduit 410, and although shown disposed within the conduit 410, it will be appreciated that the features discussed herein, could be utilized with pump systems positioned outside of the conduit.

During operation, the fluid carried within the housing 402 travels between chambers 406, 408 as piston 404 slidingly engages within the housing, as depicted with arrow D2. The control system 306 is configured to control the fluid traveling through conduit 410 via the pump system, which in turn is utilized to alter the fluid pressure within each chamber 406, 408, resulting in a damper dynamic spring rate change. Thus, it is contemplated having control system 306 operably associated with the pump systems of each damper to individually control each damper to simultaneously change the dynamic spring rate of each individual damper to reduce, if not eliminate, the forces exerted on hub assembly.

The pump system 412 provides a controllable means to alter the dynamic spring rate of the damper by controlling the quantity of fluid entering or exiting chambers 406 and 408, which in turn alters the fluid pressure inside chambers 406 and 408. For example, a compressive force on the damper will displace the piston 404 in a direction that reduces the volume of chamber 408 and simultaneously enlarge the volume of chamber 406. This compressive load on the damper will cause a pressure increase in chamber 408 and expel fluid into conduit 410; conversely, pressure in chamber 406 will decrease and fluid will be drawn from conduit 410. The pump system 412 can be commanded in three different modes; one mode that is neutral and allows fluid transfer from chamber 408 through conduit 410 into chamber 406; or a mode that retards fluid flow from chamber 408 to chamber 406; or a mode that accentuates fluid flow from chamber 408 to chamber 406. The pump system 412 can be commanded to alter the pressures inside chambers 406 and 408, and alter the fluid flow between chambers 406 and 408. Thus, the dynamic spring rate of the damper can be tailored by pump system 412 actions.

The dynamic motions of helicopter rotor blades are oscillatory in nature at oscillatory frequencies equivalent to harmonics of the rotor speed (i.e. 1/rev, 2/rev, 3/rev . . . ). Therefore, the dynamic displacements across a rotor damper and the dynamic forces upon a rotor damper are also oscillatory in nature at rotor harmonic frequencies. The function of a rotor damper is to reduce the inplane (lead-lag) motions of the rotor blade and also reduce the oscillatory forces transmitted from the blades to the rotor hub. The blade motions and forces transmitted to the rotor hub are dependent upon the dynamic spring rate of the damper. For a particular flight condition, the blade motions and transmitted forces can be minimized with an appropriate damper dynamic spring rate design. However, the dynamic blades motions vary with helicopter flight conditions, and a passive damper with a non-variable dynamic spring rate design is not optimum for all flight conditions. An active damper with a pump system 412 can be designed and controlled to adjust the dynamic spring rate and achieve optimum performance for all flight conditions.

The active damper is a closed loop control system that requires feedback sensors to inform the control computer of the damper properties and performance. Feedback sensors could be of a type that measure displacement, forces, pressures, strains, vibrations, or rotor speed. Feedback sensors can be located on the dampers, the rotor blades, the rotor hub, the helicopter fuselage, or any combination thereof. The feedback sensors provide performance information to the control computer, from which the control computer determines the appropriate commanded actions of the pump system 412 to adjust the dynamic spring rate of the damper to achieve optimum performance.

The active damper can be designed and controlled to provide optimum performance for rotor blade motions at a particular harmonic frequency, or for multiple harmonic frequencies simultaneously. On a multi-bladed rotor, the active dampers can be controlled in a manner that the summation of oscillatory forces and vibrations at the rotor hub are minimized.

It should be appreciated that the contemplated embodiment is a closed-loop active control system, thus feedback sensors 702 to the control computer 509 are needed. Feedback sensors cold be in the form of displacement sensors to measure damper stroke "D2"; pressure sensors to measure pressure in chambers 406 & 408; strain gages to measure strains/forces within the damper; load cells to measure forces between the damper and rotor; or accelerometers to measure rotor vibrations.

Figure 5:
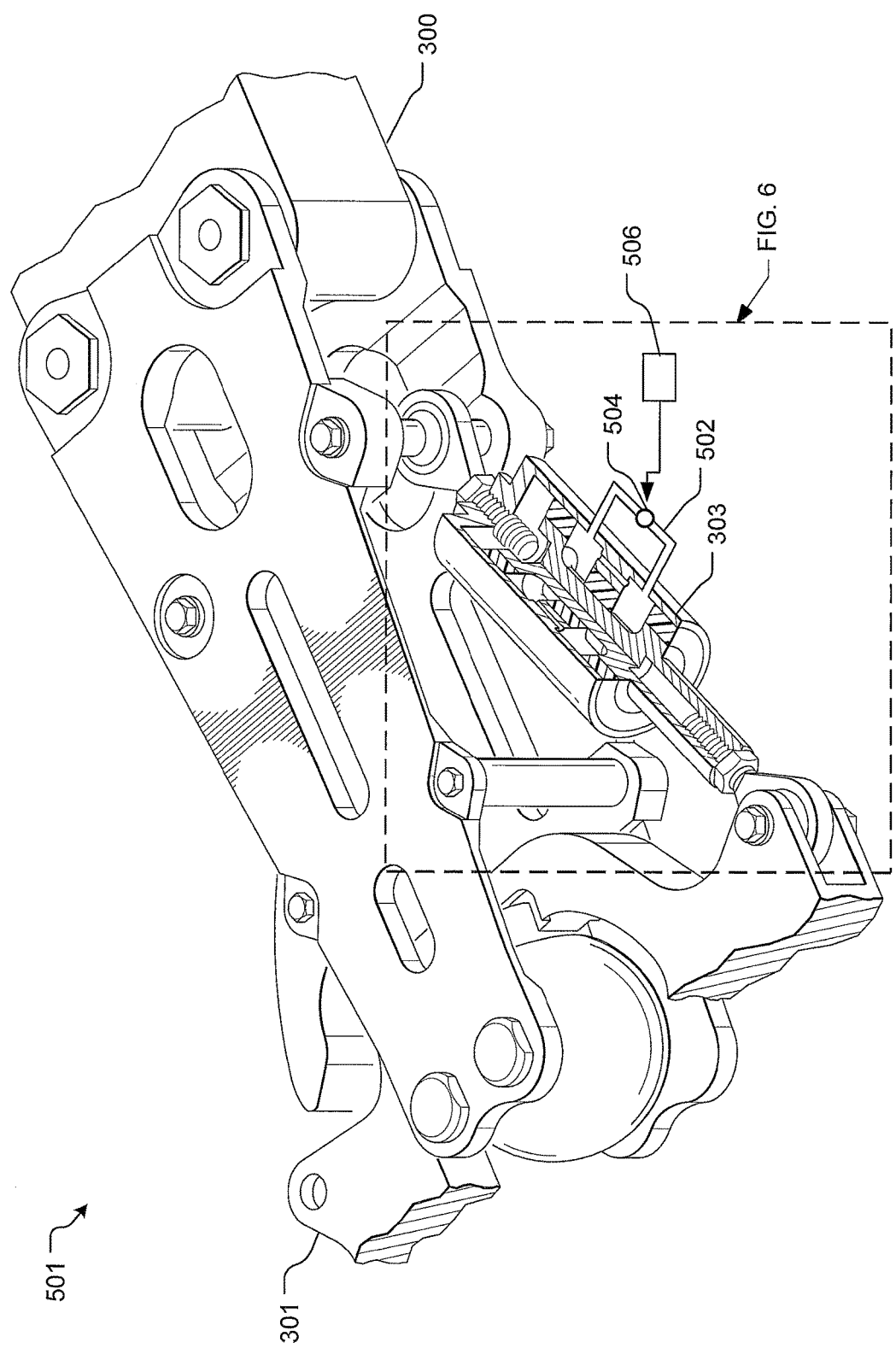
FIGS. 5 and 6 are oblique views of a rotary system in accordance with an alternative embodiment of the present application.
Figure 6:
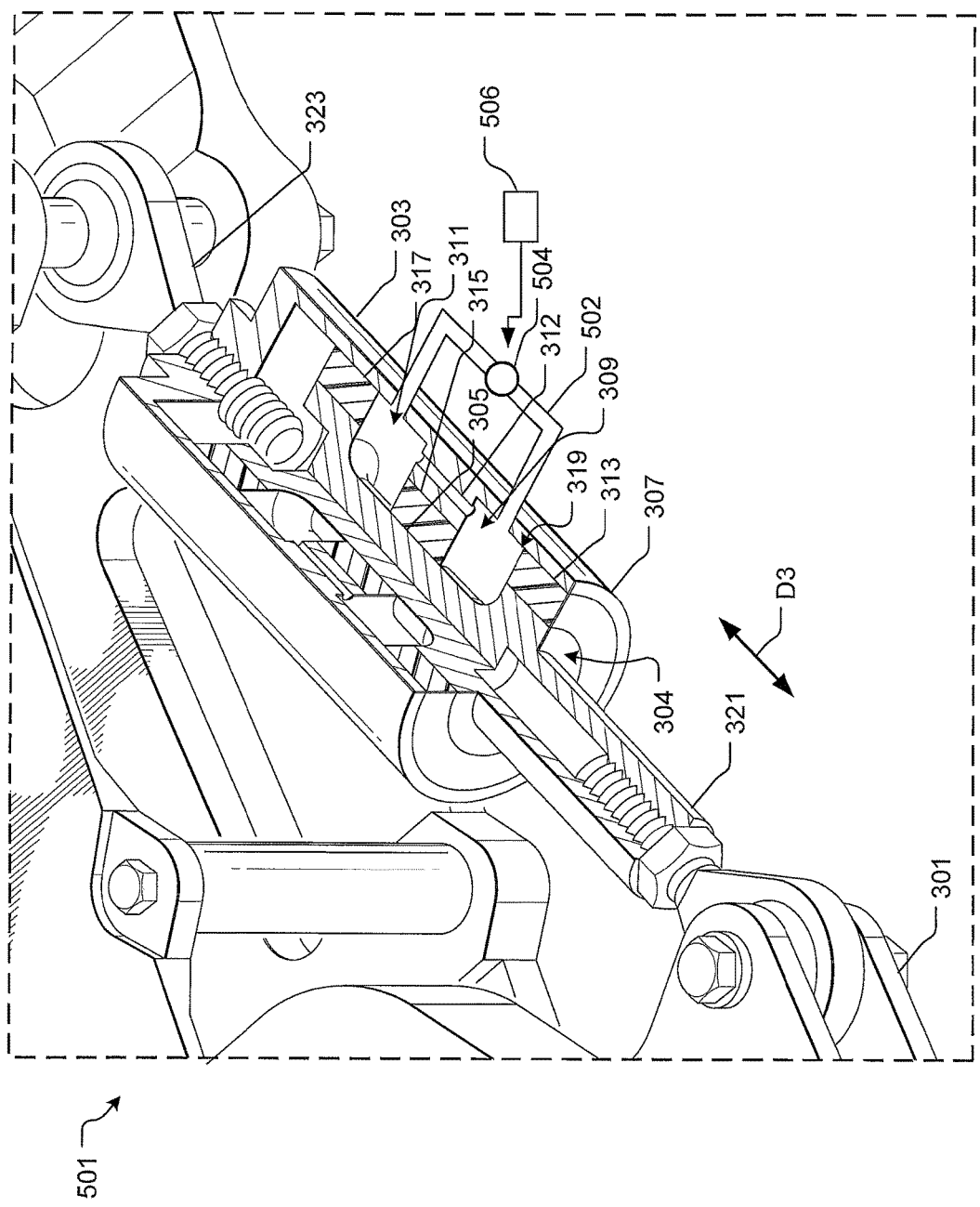

FIGS. 5 and 6 depict perspective views of a rotor system 501 in accordance with an alternative embodiment of the present application. It will be appreciated that the features of rotor system 501 are substantially similar in form and function to the rotor system 105 discussed above, namely, the features of actively controlling the forces exerted on the rotor hub assembly by separately controlling each lead-lag damper with a control system. In the embodiment of system 501, the same results are achieved via a damper having actively controllable dynamic response characteristics.

Rotor system 501 includes a yoke 301 rotatably attached to a rotor blade 300. A lead-lag damper 303 is shown operably attached to both yoke 301 and blade 300. During operation, damper 303 alters the dynamic forces exerted on the yoke via the blade.

In the exemplary embodiment, damper 303 is shown operably associated with the rotor system; however, it will be appreciated that the features of the damper system discussed herein could also be utilized on one or more different systems and devices of the aircraft or other machinery and should not be narrowly construed as limited to rotor systems.

Damper 303 includes a dampening device 304 configured to dampen forces exerted against damper 303, which in the preferred embodiment, is a piston 305 disposed within a housing 307 and situated between two fluid chambers 309 and 311. In one contemplated embodiment, a passageway 312 extends through the thickness of piston 305 and provides fluid communication between the two chambers. The exemplary embodiment could also utilize elastomeric seals, specifically, three elastomeric seals 313, 315, and 317 to secure piston 305 to an inner surface 319 of housing 307.

It will be appreciated that damper 303 could also incorporate one or more of the features of damper 304a discussed above. In particular, damper 303 could also utilize the features of a conduit 502 extending outside the housing of damper 303 and operably associated with a pump system 504 operably associated with a control system 506.

Damper 303 is shown pivotally attached to yoke 301 via a piston rod 321, and pivotally attached to rotor blade 300 via a fastener 323 that attaches to housing 307. During operation, the elastomeric materials and fluid passing between the two chambers operate to alter the forces exerted on the rotor yoke via the rotor blade, as depicted with arrow D3 in the drawings. In the illustrative embodiment, damper 303 is configured to reduce lead/lag forces of the rotor blade. Of course, it will be appreciated the features discussed herein could be incorporated on other types of dampers that dampen different forces in lieu of the preferred embodiment.

Figure 7:
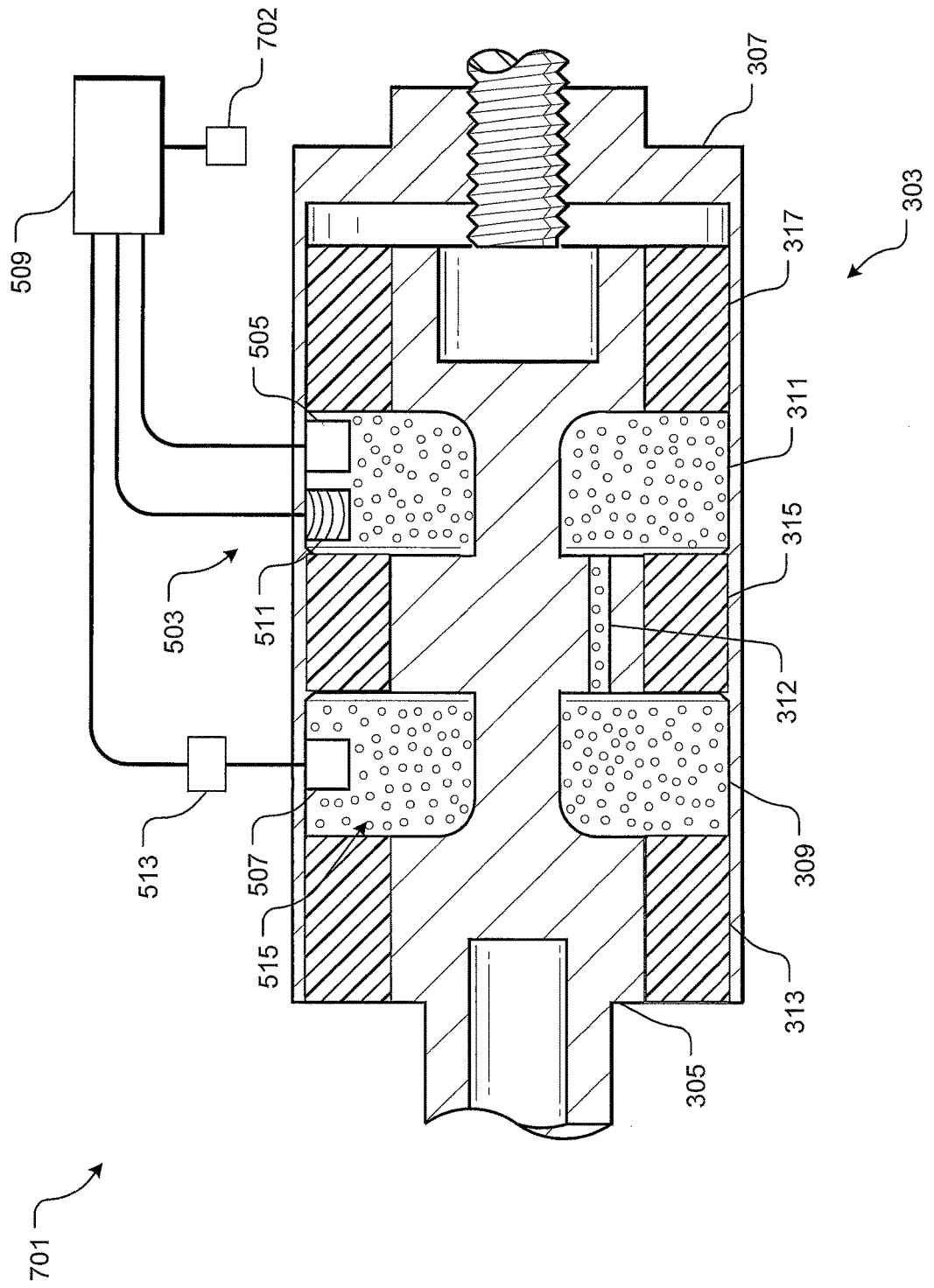
FIG. 7 is a cross-sectional view of the damper of FIG. 5.

In FIG. 7, a cross-sectional view of a damper 701 is shown in accordance with an alternative embodiment of the present application. Damper 701 is substantially similar in form and function to the dampers discussed above, and incorporates one or more of the features, and vice-versa.

Damper 701 includes one or more of a heater 503, a sensor 505, an electrical subsystem 507, and a control subsystem 509; all being operably associated with damper 303.

Heater 503 is configured to provide heat energy, for example, provide heat energy to the elastomeric material and to the fluid of damper 303. In the contemplated embodiment, heater 503 includes a plurality of coils 511 disposed within chamber 311; however, it will be appreciated that alternative embodiments could include other types of heating means positioned within the chamber.

One unique feature believed characteristic of the present application is warming the components of the damper with heat energy from the heater prior to flight. This feature greatly reduces the time and costs associated with preparing the aircraft for flight. It should be appreciated that these features overcome the problems commonly associated with conventional damper systems.

Electrical subsystem 507 is configured to provide electrical energy to the fluid disposed within damper 303. In the contemplated embodiment, electrical subsystem 507 is positioned within chamber 309 and conductively coupled to an electrical energy source 513. During operation, the electrical subsystem 507 induces electrical energy in the fluid. To achieve this feature, fluid 515 is an electrorheological fluid that changes in viscosity as electrical energy is added "induced."

Another unique feature believed characteristic of the present application is changing the dynamic spring rate of damper 303 in real time by changing the viscosity of the fluid by utilizing the electrorheological fluid and the electrical subsystem 507. Thus, the damper allows selective controlling of the dynamic spring rate in real time according in accordance with different flight conditions. This feature overcomes the problems commonly associated with dampers, for example, dampers having a single dynamic spring rate.

In the contemplated embodiment, sensor 505 is operably associated with both heater 503 and electrical subsystem 507 for sensing energy output and operation of damper 303, and is configured to relay the sensed data to control subsystem 509. The control subsystem 509 then either autonomously or manually regulates to heat and/or electrical input, thereby warming the components of damper 303 and/or changing the dynamic spring rate by regulating the electrical energy.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor system, comprising:
    a hub assembly;
    a first, second, and third rotor blade rotatably attached to the hub assembly;
    a first, second, and third damper pivotally attached to the hub assembly and pivotally attached to the first, second, and third rotor blade, respectively;
    a control system operably associated with the first, second, and third damper;
    the first damper having;
        a housing;
        a pump system controlled by the control system; and
        a dampening device disposed within the housing and configured to alter dynamic forces exerted on the first damper;
    the second damper having;
        a housing;
        a pump system controlled by the control system; and
        a dampening device disposed within the housing and configured to alter dynamic forces exerted on the second damper; and
    the third damper having;
        a housing;
        a pump system controlled by the control system; and
        a dampening device disposed within the housing and configured to alter dynamic forces exerted on the third damper;
    wherein each damper is a closed loop control system that uses feedback sensors to inform a control computer of the damper properties and performance which is then used to determine an appropriate action of the pump system to adjust the dynamic spring rate of the damper to achieve optimum performance.

2. The system of claim 1, wherein the dampening device of the first damper is formed of an elastomeric material; and
wherein the elastomeric material secures the dampening device of the first damper to an inner surface of the housing of the first damper.

3. The system of claim 1, wherein the dampening device of the first damper is a piston.

4. The system of claim 3, wherein the piston forms a first fluid chamber and a second fluid chamber; and
wherein fluid is channeled between the first fluid chamber and the second fluid chamber as the piston moves within the housing of the first damper.

5. The system of claim 4, further comprising:
a fluid passage extending through the piston;
wherein the passage is configured to channel fluid from the first chamber to the second chamber.

6. The system of claim 4, further comprising:
a conduit positioned outside the housing of the first damper and in fluid communication with the first fluid chamber and the second fluid chamber.

7. The system of claim 6, further comprising:
the pump system of the first damper in fluid communication with the conduit of the first damper;
wherein the pump system of the first damper is configured to pressurize the fluid disposed within the first and second fluid chambers.

8. The system of claim 7, wherein the pump system of the first damper is disposed within the conduit of the first damper.

9. A rotor system, comprising:
a hub assembly;
a first and second rotor blade rotatably attached to the hub assembly;
a first and second damper pivotally attached to the hub assembly and pivotally attached to the first and second rotor blade, respectively;
a first pump system and a second pump system operably associated with the first and second dampers, respectively; and
a control system operably associated with the first and second pump systems;
wherein each damper is a closed loop control system that uses feedback sensors to inform a control computer of the damper properties and performance which is then used to determine an appropriate action of the pump system to adjust the dynamic spring rate of the damper to achieve optimum performance.

10. The rotor system of claim 9, the first damper having:
a housing; and
a dampening device disposed within the housing and configured to alter dynamic forces exerted on the first damper.

11. The system of claim 10, wherein the dampening device is a piston.

12. The system of claim 11, wherein the piston forms a first fluid chamber and a second fluid chamber; and
wherein fluid is channeled between the first fluid chamber and the second fluid chamber as the piston moves within the housing.

13. The system of claim 12, further comprising:
a conduit positioned outside the housing and in fluid communication with the first fluid chamber and the second fluid chamber.

14. The system of claim 13, wherein the first pump system is in fluid communication with the conduit.

15. The system of claim 14, wherein the pump system is disposed within the conduit.

16. The system of claim 9, wherein fluid within the damper is an electrorheological fluid configured to change viscosity as electrical energy is induced.

17. A method to control vibratory forces exerted on an aircraft hub assembly via a plurality of rotor blades, comprising:
attaching a damper to each of the plurality of rotor blades; and
controlling a dynamic spring rate of each of the dampers associated with the plurality of rotor blades by individual pump systems for each of the dampers;
wherein each damper is a closed loop control system that uses feedback sensors to inform a control computer of the damper properties and performance which is then used to determine an appropriate action of the pump system to adjust the dynamic spring rate of the damper to achieve optimum performance.

18. The method of claim 17, further comprising:
individually pressurizing fluid disposed within the dampers via a control system.

* * * * *